United States Patent [19]

Jackson et al.

[11] Patent Number: 4,714,342
[45] Date of Patent: Dec. 22, 1987

[54] FIBER OPTICAL INTERFEROMETRIC TEMPERATURE SENSOR WITH RAMP MODULATION

[75] Inventors: David A. Jackson, Canterbury, England; Michael Corke, Wheaton, Ill.; Alan D. Kersey, Washington, D.C.

[73] Assignee: Kent Scientific and Industrial Projects Limited, Kent, England

[21] Appl. No.: 684,925

[22] PCT Filed: Apr. 24, 1984

[86] PCT No.: PCT/GB84/00138
§ 371 Date: Dec. 18, 1984
§ 102(e) Date: Dec. 18, 1984

[87] PCT Pub. No.: WO84/04385
PCT Pub. Date: Nov. 8, 1984

[30] Foreign Application Priority Data
Apr. 21, 1983 [GB] United Kingdom ............... 8310835

[51] Int. Cl.[4] ........................... G01J 5/38; G01B 9/02
[52] U.S. Cl. .................................. 356/44; 356/345; 374/161
[58] Field of Search ................... 356/43–45, 356/345, 346, 349, 352, 73.1; 250/227; 374/131, 161

[56] References Cited

U.S. PATENT DOCUMENTS

| | | | |
|---|---|---|---|
| 3,977,788 | 8/1976 | Moore | 356/352 |
| 4,322,829 | 3/1982 | Davis, Jr. et al. | 367/149 |
| 4,368,981 | 1/1983 | Ozeki | 356/352 |
| 4,374,328 | 2/1983 | Tekippe et al. | 356/43 X |
| 4,432,599 | 2/1984 | McMahon | 250/227 X |
| 4,493,995 | 1/1985 | Adolfsson et al. | 356/44 X |
| 4,552,457 | 11/1985 | Giallorenzi et al. | 356/345 |

FOREIGN PATENT DOCUMENTS 2096784 10/1982 United Kingdom ............... 356/44

OTHER PUBLICATIONS

Imai et al., "Fiber-Optic Michelson Interferometer Using an Optical Power Divider", Optics Letters, vol. 5, #10, Oct. 1980, pp. 418–420.

Glatzel et al, "Temperature Measurement Technique Using Fresnel Interference Technique", IBM Technical Disclosure, vol. 20, No. 11A, Apr. 1978, pp. 4571–4572.

Primary Examiner—Vincent P. McGraw
Attorney, Agent, or Firm—Bell, Seltzer, Park & Gibson

[57] ABSTRACT

A temperature sensor comprises a single-mode all-fiber Michelson interferometer. The interferometer includes a bi-directional coupler and signal and reference fibers having mirrored ends. These two fibers are of unequal lengths to provide an optical path length in-balance and the signal fiber may have a metal temperature sensing probe at its mirrored end. The injection current of a laser light source for the interferometer is modulated with a ramping signal so that a linearly moving interference pattern is produced at the output by mixing of the reflected beams propagated in the signal and reference fibers. The interference pattern is monitored by a photodetector and electronic circuitry processes the output of the photodetector to determine the optical phase shift between the light beams propagated in the signal and reference fibers, which phase shift is dependent on expansion or contraction of the signal fiber with respect to the reference fiber and is therefore related to the temperature at the sensing probe.

7 Claims, 2 Drawing Figures

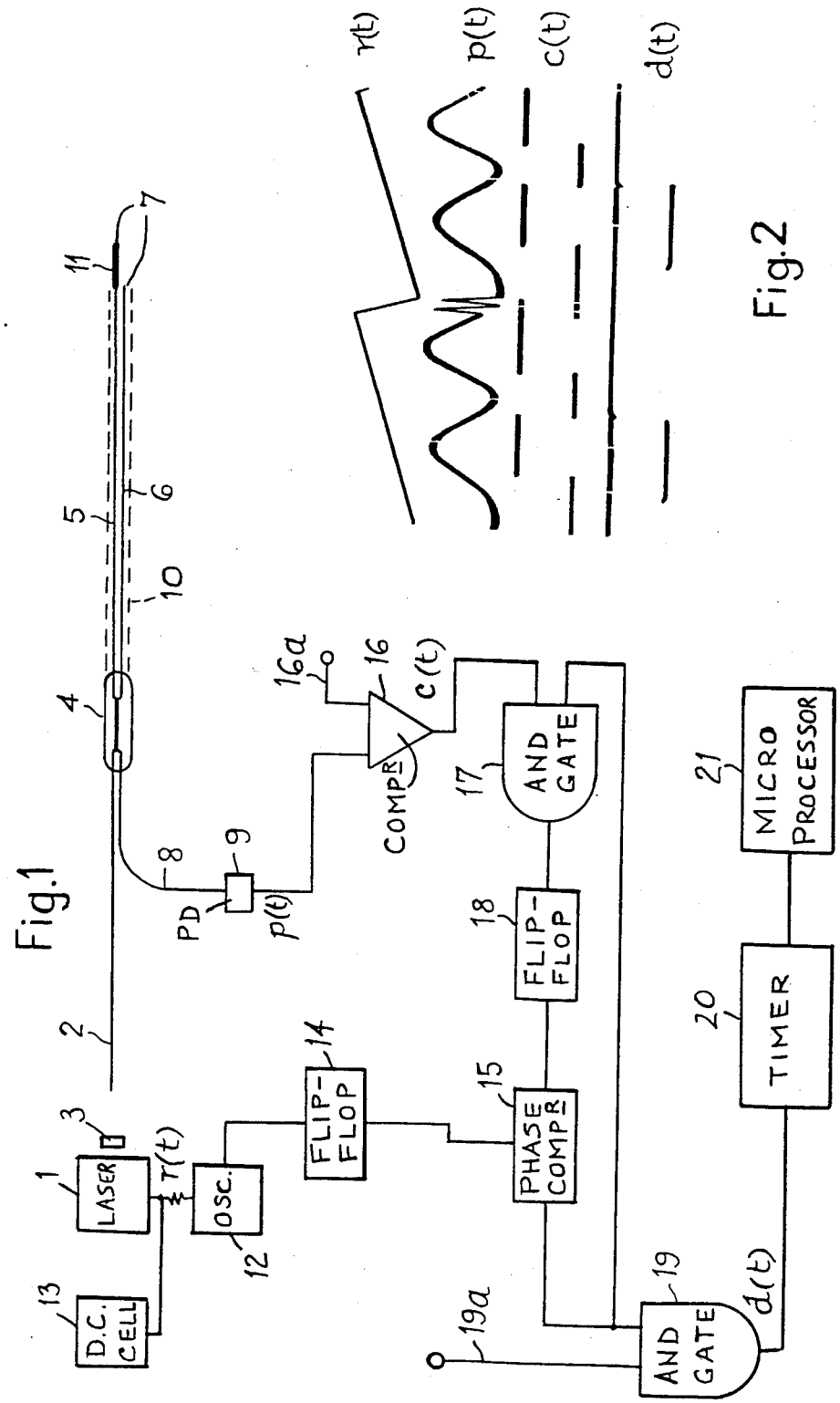

FIBER OPTICAL INTERFEROMETRIC TEMPERATURE SENSOR WITH RAMP MODULATION

BACKGROUND OF THE INVENTION

The present invention relates to a temperature sensor based upon an optical interferometer which is constructed from single mode optical fibre and in which the detection and measurement of temperature is based upon optical interference or fringe patterns. More particularly, it relates to such a temperature sensor based on an all fibre Michelson interferometer which can be operated remotely from sources of power or light generation and is connected to such sources by optical fibres.

The measurement of temperature in an industrial environment is usually achieved using well-established transducers such as platinum resistance thermometers, thermocouples or bi-metallic strips. Although these transducers have become industry standards it has become evident that there is a demand for new types of thermometers for special applications where electrically based transducers cannot operate for reasons of safety or the presence of noisy electrical environments. Some of the potential applications of optical fibre thermometry are in the measurement of temperature in for example jet engines, nuclear reactors, and transformers. A fibre optic thermometer could also be used in the treatment of cancer where the tumour is subjected to microwave radiation which consequently eliminates the use of any of the conventional electronic sensors.

Optical phase modulation sensors offer the highest resolution of all optical displacement sensors; for example, classical interferometers of the Michelson or Mach Zehnder type can be used to detect displacements as small as $10^{-14}$ m. Although interferometers offer tremendous resolution (or sensitivity) until recently very little effort had been devoted to developing them into general purpose displacement sensors. This is primarily because the sensitivity of an interferometer is a function of the relative alignment of the optical beams, and in a typical interferometer where beam splitters and mirrors are used to control the amplitude division and recombination of the light the sensitivity will fluctuate if the optical components are randomly disturbed. However, the recent introduction of all fibre interferometers has virtually eliminated this problem as the alignment of the fibre guided optical beams is virtually immune from mechanical disturbance.

SUMMARY OF THE INVENTION

It is an object of the present invention to provide a temperature sensor based on an optical interferometer constructed with optical fibres.

The invention consists in a temperature sensor comprising an optical interferometer, conveniently of the Michelson type, constructed from single-mode optical fibre and having an input and output coupled by coupling means to signal and reference optical fibres, said signal and reference fibres being of unequal lengths to provide optical path length imbalance and having reflecting ends remote from the coupling means to reflect light beams propagating in said fibres, said signal fibre having a sensing zone at its reflecting end, and said coupling means being adapted to mix the reflected beams in the fibres to produce an interference pattern at said output, a photodetector for monitoring the interference pattern at said output, a laser light source coupled to said input, means for modulating the laser injection current to produce a moving interference pattern, and means for processing the output of the photodetector to determine the optical phase shift between the light beams propagated in the signal and reference fibres which phase shift is related to the temperature at the sensing zone of the signal fibre.

Preferably, the laser light source is coupled to the input by a single mode optical fibre and the coupling means is a single mode optical fibre directional coupler. The photodetector may also be coupled to the output by an optical fibre.

In one preferred embodiment of the invention light from a single-frequency diode laser ($\lambda \approx 800$ nm) is coupled into the single-mode optical input fibre and is then amplitude divided by the single-mode directional coupler into the signal and reference fibres or arms of the fibre interferometer. The normally cleaved ends of the fibre arms are coated with silver and thus act as mirrors, such that the optical 'beams' propagating in the signal and reference arms are reflected back towards the coupler, where optical mixing takes place to produce fringe patterns which are monitored by a photodiode detector. Any optical path difference between the fibre arms causes a change in the output signal, with a differential length change of 400 nm giving rise to a shift of one optical fringe. The signal and reference fibres are closely coupled together along their entire lengths except at their mirrored ends where the signal or sensing fibre is for example 1–5 cm longer, thus providing the localised sensing zone or element and a path length imbalance in the interferometer, the latter being necessary in the signal recovery scheme used. Close coupling of the two fibres along their length (for example $\lambda \approx 1$ m to 2.5 m) provides a high degree of common mode rejection and substantially reduces the effect of environmental induced perturbations.

It has been shown that a change in temperature $\delta\phi T$ of a single-mode optical fibre of length L and core refractive index n modifies the phase of the light by $$\delta\phi = \frac{2\pi}{\lambda} \left( \frac{n}{L} \frac{dL}{dT} + \frac{dn}{dT} \right) L \delta T$$

where 1/L (dL/dT) is the linear expansion of the fibre and dn/dT is the temperature dependence of the refractive index. In the Michelson interferometer the optical signal traverses the sensing element twice, so that L is twice the physical length of the sensing element. For uncoated silica fibres dn/dT is the dominant component contribution over 95% of the thermally induced phase shift. Thus in order for thermal expansivity to contribute significantly, the sensing fibre should be bonded to a material with a large coefficient of linear expansion.

The signal monitoring or recovery scheme is preferably based on frequency ramping of the laser, thus dispensing with the need for active phase compensation in the fibre arms. The basis of the scheme is that a moving fringe pattern is created in the unbalanced Michelson interferometer output by linearly ramping the laser injection current (above threshold), and thus ramping the absolute frequency of the laser.

The complete optical thermometer may operate in the following manner. The optical frequency of the laser source is modulated by imposing a ramp or sawtooth waveform on the laser's threshold or bias current. As a result of this modulation and the unequal path lengths in the interferometer the transfer function at the interferometer output is repeatedly sampled. Standard logic circuits can be used to convert this signal into a form suitable for processing by digital electronics.

The time delay between the start of the ramping waveform applied to the laser and the 'fringe' edge may be determined using a high speed clock and counter; this time varies as the length of the signal arm changes and thus enables the total change in the optical path length to be measured. The signal processing may be entirely digital and the data may be presented in a form suitable for computer storage or a digital display meter; the resolution of the system may correspond to $\sim 10^{-3}$ of a fringe shift.

When the signal arm or fibre is heated both its length and refractive index change and in general the change in the optical path length with temperature is not linear. A much more linear response is obtained by attaching the sensing end of the signal fibre to a small metal tube where the expansion of the metal tube then dominates the internal changes of the fibre. Such a system has been proved over a working range of $>300°$ C. with a resolution of $\sim 2 \times 10^{-3°}$ C.

The present invention can be used to measure temperatures over a wide range, for example, $-50°$ C. to $1500°$ C. It can be used to measure temperatures in the range $-100°$ C. to $1000°$ C. with $\pm 0.025°$ C. accuracy. A major advantage of the invention is that it does not require any voltage or current source close to the point of temperature measurement. Furthermore, the sensor does not produce any local voltage signals and can be considered safe for operation in hazardous environment, such as, a coal mine, oil well or any industrial environment.

BRIEF DESCRIPTION OF THE DRAWINGS

In order that the present invention may be more readily understood, reference will now be made to the accompanying drawings, in which:

FIG. 1 is a schematic and block circuit diagram of one embodiment of the invention, and FIG. 2 illustrates the signal waveforms occurring at various points in the circuit of FIG. 1.

DESCRIPTION OF THE PREFERRED EMBODIMENTS

Referring to FIG. 1, light from a single frequency diode laser 1 is coupled into a single mode optical fibre 2 via an isolator 3 and is then divided by a single mode fibre directional coupler 4 into the signal 5 and reference arms 6 of the all-fibre Michelson interferometer. The distal ends 7 of the single mode fibre arms 5,6 are coated with a highly reflected film so that they act as mirrors. The optical 'beams' propagating in the signal and reference fibres 5,6 are then reflected back towards the coupler 4 where they mix and interfere to produce a fringe pattern which is monitored at the output fibre 8 by a photodiode 9. Any differential between the fibres causes a change in the output signal. For example, using a light of wavelength 800 nm a differential length change of 400 nm gives rise to a shift of one optical fringe. The signal and reference fibres are closely coupled together along their entire lengths and contained in a flexible metal sheath 10 except the mirrored ends where the sensing fibre is, for example, 2 cm longer providing a localised sensing zone and a path length imbalance in the interferometer. This imbalance in the optical path length is utilised in signal recovery. The close coupling of the two fibres 5,6 along their lengths reduces the effect of environmental induced perturbations to the fibre by the process of 'common mode rejection'. The sensing zone of the signal fibre is bonded into a metal sheath or coated with a metal film to form the temperature sensing probe 11. The relatively large coefficient of expansion of the metal amplifies the temperature induced dimensional change of the fibre. It is, however, possible to operate the temperature sensor without coating the signal fibre, in which case the sensitivity will be reduced.

The temperature of the sensing probe 11 is obtained using a novel signal processing system which is more fully described below and which utilises linear frequency modulation of the laser 1. This is achieved by injecting a high frequency ramp or sawtooth current onto the laser diode's bias current derived from an oscillator. The use of this modulated laser diode light source in the unbalanced interferometer produces a linearly moving fringe pattern. The amplitude and frequency of the modulation determine the effective frequency recovered at the photodiode 9. In this processing scheme at least one full fringe must pass the detector for each period of the 'sawtooth' current. Suitable electronic circuitry is used to convert the output of the photodiode into a 'square-wave'; the rising edge of the 'square-wave' defines a unique point on the moving fringe pattern.

Additional electronic circuits measure the time between the start of the sawtooth ramp and the rising edge of the square-wave. If the temperature of the probe is constant then this time remains constant. A change in temperature of the probe causes the relative time between the start of the sawtooth ramp and the rising edge defining the unique point in the fringe pattern to change. These changes are continuously recorded in the electronic processing unit. This allows the total length of increase (or decrease) in the sensing probe 11 to be determined which is directly related to the temperature. The temperature probe is calibrated against known fixed temperature sources. Extrapolation between these points allows intermediate temperatures to be determined.

Hence, the signal processing system comprises an oscillator or ramp generator 12 for modulating the laser-injection current, supplied by the DC cell 13 (e.g. a Ni-Cad cell), with a high frequency ramp current. This ramping signal may have a frequency in the range from 100 Hz-10 kHz, e.g. 5 kHz. A high frequency reference square wave derived from the oscillator 12 via a JK flip-flop 14, which also divides the signal by two, is supplied to one input of a phase comparator 15.

The output from the photodiode detector 9 is connected to one input of a high gain comparator 16 having its other input 16a connected to a reference voltage. The output of the comparator 16 is a square wave and this is fed to one input of a logic AND gate 17 having its output connected, via a JK flip-flop 18, which divides the signal from the AND gate 17 by two, to the second input of the phase comparator 15. The output of the latter is connected to the second input of the AND gate 17 and also to one input of a second logic AND gate 19 having its other input 19a connected to receive pulses from a clock pulse generator, for example, a 1 MHz generator. The signals from the output of the gate 19 are fed, via a timer 20, to a microprocessor 21 for processing and storing.

In FIG. 2, r(t) and p(t) show the time variation of the optical intensity at the interferometer output when the laser injection current is ramp-modulated. This output is fed to the high-gain comparator 16 and 'hard-limited' to form a series of pulses c(t). The remaining electronics measure the time $t_1 = (\tau - \tau_D)$ where $\tau$ is the time, between the start of the ramp r(t) and the first negative edge encountered in the photodiode output signal p(t), and $\tau_D$ is a time delay. This time, $t_1$ is directly related to the optical phase shift between the arms 5,6 of the Michelson interferometer; $t_1$ is measured by performing a phase comparison between the square wave, derived from the first negative edge in the photodiode output in each ramp period, and the reference square wave obtained directly from the ramp generator 12. The ramp generator frequency is chosen to be two orders of magnitude higher than the temperature induced fringe drift rate so that relatively simple decision making electronics are used to determine when the fringe pattern corresponds to a new fringe number. By using the 1 MHz clock an accurate determination of the pulse width $t_1$ is obtained, from which the direction and magnitude of the temperature change is determined. The lower two traces c(t) and d(t) in FIG. 2 show the output of the comparator 16 in the upper trace and the input to the microcomputer 21 in the lower trace.

We claim:

1. An optical temperature sensor comprising:
   an all-fiber Michelson interferometer;
   said interferometer comprising an input and an output, a signal optical fiber and a reference optical fiber formed from single mode optical fiber and having unequal lengths to provide optical path length imbalance, said signal and reference optical fibers having proximal ends for coupling to said input and output and distal ends remote therefrom, said distal ends being adapted to reflect light beams propagated in said signal and reference optical fibers back towards said proximal ends thereof, means defining a temperature sensing zone of said signal optical fiber at and adjacent said distal end thereof, and directional coupling means coupling said input and output of said interferometer to said proximal ends of said signal and reference optical fibers, said directional coupling means being adapted to mix said light beams reflected back to said proximal ends of said signal and reference optical fibers to produce an interference pattern at said output of said interferometer corresponding to the optical phase shift between said light beams respectively propagated in said signal and reference optical fibers which phase shift is related to the temperature at said sensing zone of said signal optical fiber,
   a laser light source controlled by a laser injection current,
   means coupling said laser light source to said input of said interferometer, whereby said directional coupling means injects light from said laser light source into said proximal ends of both said signal and reference optical fibers to propagate said light beams therein,
   means for modulating said laser injection current with a modulation signal to produce a moving said interference pattern at said output of said interferometer,
   photodetector means for monitoring said moving interference pattern at said output and producing a photodetector output signal corresponding thereto, and
   means for processing said photodetector outputs signal with respect to time for continuously monitoring a predetermined time period related to the movement of said interference pattern, whereby to derive a signal identifying the temperature detected at said sensing zone of said signal optical fiber.

2. The temperature sensor claimed in claim 1, wherein said means coupling said laser light source to said input of said interferometer comprises a single mode optical fiber, and said coupling means of said interferometer comprises a single-mode optical fiber directional coupler, and wherein said photodetector means is coupled to said output of said interferometer by an optical fiber.

3. The temperature sensor claimed in claim 1, wherein said sensing zone of said signal optical fiber comprises a material having a larger coefficient of linear expansion than said signal optical fiber.

4. The temperature sensor claimed in claim 1, wherein said signal and reference optical fibers are close coupled along substantially the entire lengths thereof.

5. The temperature sensor claimed in claim 1, wherein said modulating means modulates said laser injection current of said laser light source with a ramp signal to produce a linearly moving interference pattern at said output of said interferometer.

6. The temperature sensor claimed in claim 1, wherein said processing means is adapted to compare said laser current modulating signal with said photodetector output signal.

7. The temperature sensor claimed in claim 6, wherein said processing means is adapted to continuously monitor the time difference between the start of each cycle of said laser current modulating signal and the leading edge of a square wave signal derived from said photodetector output signal.

* * * * *